United States Patent Office 3,107,161
Patented Oct. 15, 1963

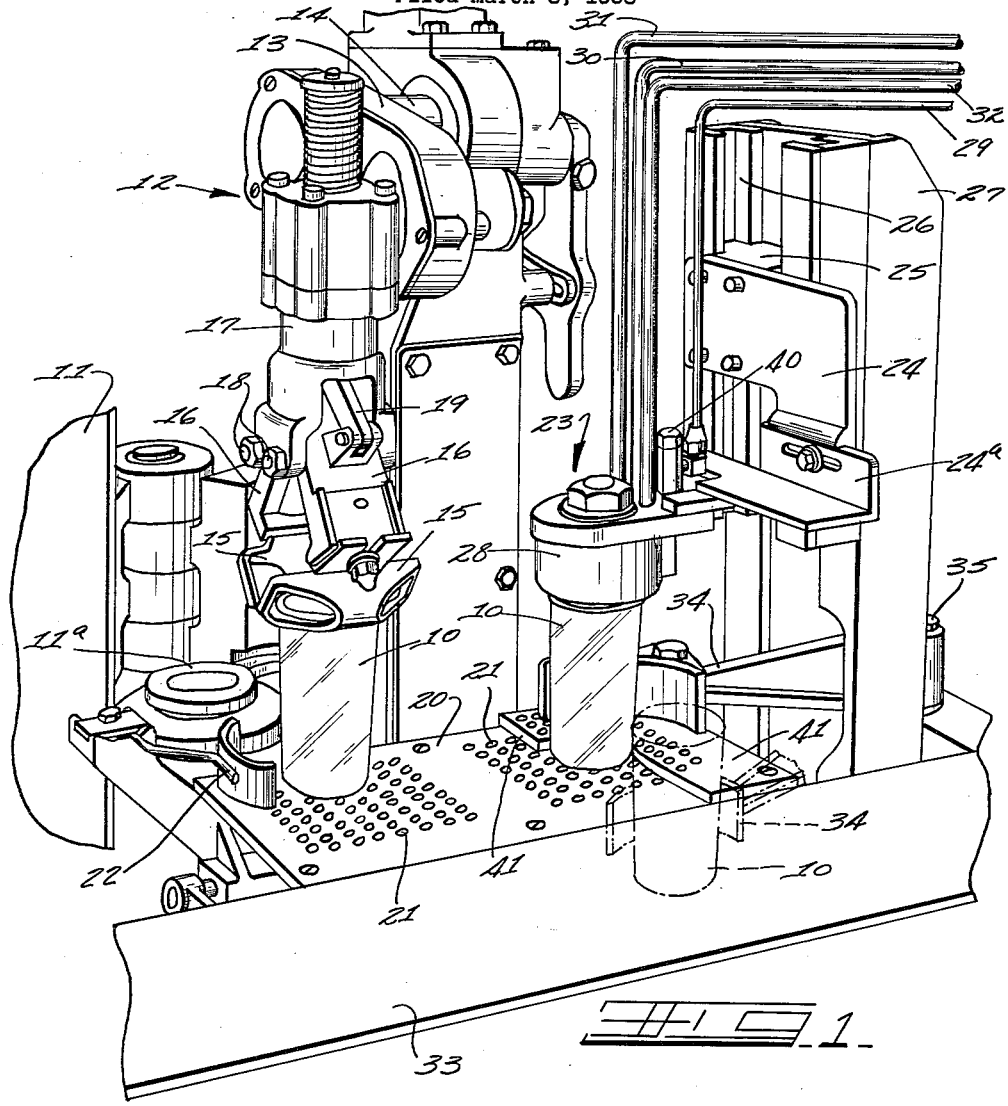
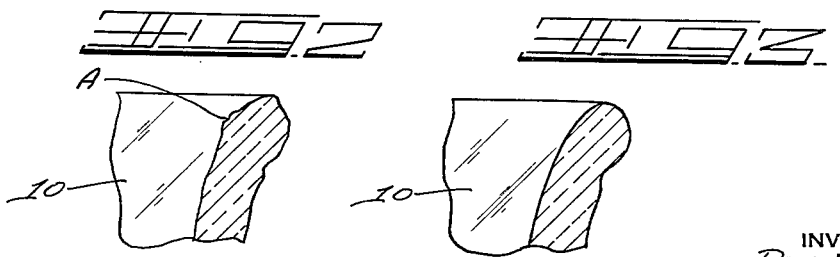

3,107,161
METHOD OF FIRE FINISHING GLASS TUMBLERS
Paul E. Bivens and Luther H. Wideman, Toledo, Ohio, assignors to Owens-Illinois Glass Company, a corporation of Ohio
Filed Mar. 3, 1958, Ser. No. 718,636
5 Claims. (Cl. 65—65)

The present invention relates generally to a method of fire finishing the finish or mouth forming rim of glassware articles, such as tumblers, jars, and bottles, and more particularly to fire finishing tumblers made on a glassware molding machine in which such finishing is preformed intermediate transfer from the molds to a moving conveyor.

By this invention, the fire finishing is strategically applied so as to eliminate the necessity of sizing the finish thereafter to correct for distortion of the rim.

Fire finishing techniques utilized heretofore have required a sizing operation to assure that the rim is in-round after fire finishing in order that a closure finish may be applied to hermetically seal the container. The present state of the art, by way of example only, is indicated in U.S. Patents Nos. 1,930,746 and 2,556,469.

It is, therefore, an object of the present invention to provide a method of fire finishing the mouth forming rim of a glass tumbler in a manner that will eliminate the need for thereafter sizing the finish of the tumbler.

Another object of the invention is to provide a practical method for fire finishing the mouth forming rim of a tumbler that is adaptable for use with existing molding machine equipment and is efficient and economical to operate.

Another object of the invention is to provide such a method of fire finishing glass tumbler rims as aforesaid, so that it will accommodate the high speed production of tumblers by present day models of commercial glass molding machines.

Other objects and advantages of the invention will hereinafter be pointed out or will become apparent from the following description of a practical embodiment thereof, as shown in the accompanying drawings, in which:

FIG. 1 is a perspective view of a mold station of the well-known Hartford-Empire "IS" machine, to which the method of the invention is shown as applied.

FIG. 2 is a cross-sectional view of a glass tumbler rim somewhat accentuated to illustrate irregularities in the finish of the rim as it might appear at the time the tumbler is delivered from the forming mold but before fire finishing.

FIG. 3 is a view comparable to FIG. 2, and illustrates the glass tumbler rim after fire finishing.

The method consists generally in the removal of a formed tumbler from its forming mold and transfer onto a stationary support whereat the glass of the formed tumbler is set up to rigidify it. This setting up of the glass is usually accelerated by circulation of cooling air over the tumbler while on this support. During the setting up process, the tumbler is then shifted to a nearby point on the support to underlie an oxygen-gas fired flame projecting downwardly to impinge on the rim of the tumbler in a manner to principally heat the surface glass of the rim only so as to cause this surface glass to flow and smooth out the rim contour, yet the entire cross-section of the glass at the rim is not heated to a temperature sufficient that the rim will distort out of prescribed tolerances for acceptable commercial ware. This is accomplished by exposing the rim to the flame for but a short duration such as for a period of from 1 to 2 seconds and having the flame produce temperatures at its point of contact with the rim surface in a range of from about 3500 to 4500° F. The tumbler is then removed from the support and conveyed to a location for further processing, such as heat treatment in an annealing lehr. This short duration of exposure to the high temperature flame achieves the main purpose of fire finishing the surface glass at the rim without materially causing an out-of-round condition and eliminates the necessity for a sizing operation on the rim; and additionally, due to the short time duration of applying the fire finishing, permits performing the fire finishing operation in time with production output of the molding machine.

Referring now to the drawings, a preferred apparatus for carrying out the method will be described. On FIG. 1, tumblers 10 are successively formed in a finishing mold 11. A take-out mechanism, referred to generally at 12, has an arm 13 driven to oscillate through 180° of rotation by an oscillating shaft 14 to which it is mounted. The shaft 14 is driven in a conventional manner and in time with the operating cycles of the forming machine for successively producing the tumblers 10. A pair of take-out tongs 15 are pivotally mounted on arm assembly 16 carried by arm 13 and are operated to open and close by an air-operated cylinder in the barrel 17 of the take-out mechanism 12. Each tong carrying arm 16 pivots about a pin 18 and has a driving connection to the air cylinder in the barrel 17 by a connecting link 19.

The take-out mechanism performs the step of transferring molded tumblers 10 from finishing mold 11, after it is opened, to one side of a double-dead plate 20. Dead plate 20 is horizontally disposed at approximately the same elevation as the bottom plate 11a of mold 11.

The preferred take-out equipment and molding equipment, referred to above, are fully disclosed in Patent No. 1,911,119, issued to Ingle, May 23, 1933. The double dead plate 20, which we prefer to employ as the stationary support for the tumblers, is fully described in Patent No. 2,677,919, issued to Worrest, May 11, 1954.

With the molded tumbler 10 deposited at one side of dead plate 20 (left hand side in FIG. 1), cooling air is blown up through perforations 21 therein and the tumbler 10 is cooled down for setting up the glass to further rigidify the tumbler.

The next step involves shifting the tumbler laterally across the dead plate 20 to the fire finishing location or station. To accomplish this, the double dead plate apparatus is constructed to include a transfer arm 22 which is actuated in time with the cyclical operation of the machine in a manner to move the tumbler 10 to the other side of the dead plate 20 (right hand side in FIG. 1) to underlie a burner assembly 23. At this position, the cooling air continues to issue from the perforations 21 in the dead plate 20 to continue to cool the body portion of tumbler 10. Burner assembly 23 is mounted on a bracket 24 carried on a slide 25 which rides in vertical ways 26 on a column 27 affixed to the frame of the molding machine conveyor 33. The bracket 24 includes an adjustable portion 24a which permits sliding of the burner assembly 23 horizontally in or out with respect to the molding machine. The bracket 24 is adjustable vertically through slide 25 in ways 26 to accommodate various heights of tumblers.

The burner assembly 23 comprises a burner body 28 having an annular combustion chamber for burning the combustible products supplied to it and has an underlying or lower orifice plate (not shown) provided with a pair of circular rows of orifices concentrically arranged and communicating with said mixing chamber for issue of the combustible mixture in form of a flame produced and directed downwardly by the burner to impinge onto the rim portion of the underlying tumblers 10. The flame produced at the inner circular row of orifices is directed at an approximate 45° angle with respect to the inside of the tumbler rim. This is accomplished by having the orifices directed angularly outwardly, and the flame thus directed eliminates the inside over-press or finish mark near the tumbler rim. This over-press mark is indicated at A in FIG. 2. The outer circular row of orifices is directed vertically downwardly at the top of the rim surface.

The burner assembly 23 receives a supply of oxygen and a combustible gas, such as natural gas, piped from individual sources remotely located. In mixing the oxygen and gas, conventional mixing valve gear may be used satisfactorily. It is preferred that the burner be operated intermittently by turning the combustible mixture off and on in time with the tumblers, delivery at the burner. When this mixture is turned on, it is ignited by an oxygen-gas pilot 40 in the burner. In this system of intermittent operation, air is piped to the burner during the "off" portion of its cycle and oxygen-gas mixture is piped to it during the "on" portion of its cycle. The oxygen-gas mixture is introduced by line 30 from an oxygen-gas mixer. The air supply is connected to the burner through line 30. The oxygen-gas mixture and the air are introduced under control of valves that are actuated by buttons on the main timing drum of the molding machine. As a tumbler is inserted under the burner at the advanced or second dead plate position, pressure operated valves are actuated by the molding machine drum to turn the oxygen-gas mixture on and the air supply off for the predetermined time of burner operation. The pilot burner 40 ignites the mixture to light the burner. When the operation period expires, the oxygen-gas mixture is turned off and the air supply is turned on by counter operation of these valves and under the control of the machine timing drum. The air supply serves to maintain a continuous flow through the burner ports not only to help keep the burner ports cool but to help prevent back-fire when the oxygen-gas is turned on. The burner body 28 also has a hollow annular chamber separate from the combustion chamber to receive coolant for cooling the burner unit to prevent damage and control its operation at the high temperatures being produced. The coolant is introduced in line 31, circulated through the cooling chamber in the burner body 28 and then discharged through line 32.

At the advanced station on dead plate 20 and in alignment with the burner 23, the rim of the tumbler 10 is fire finished, as will be presently described, and thereafter moved from dead plate 20 onto a traveling straight-line conveyor 33. This conveyor is like the one described in Patent No. 1,921,390, issued to Ingle, August 8, 1933, and is integrated to operate as part of the equipment customarily used with the type of glassware molding machine herein illustrated.

The transfer from the dead plate 20 to the conveyor 33 is accomplished by outward sweeping movement of pivoted arm 34 actuated to pivot about pin 35 so that it engages the tumbler 10 and sweeps it onto the belt of conveyor 33. The arm 34 is actuated in time with and as a part of the operation of the double dead plate mechanism, as described in the aforementioned Worrest patent.

The above described existing equipment may thus be utilized to carry out the process with only a minimum of revision thereto, that revision only requiring the addition of the burner assembly and its mounting over the advanced or second position of the tumbler on the double dead plate. Also, a positioning block 41 is used to give a positive stop under the fire polishing burner. This positive positioning of the tumbler is necessary to align the rim of the tumbler in correct underlying relationship to the burner during fire polishing. The block 41 is made of transite or some similar material that will not check the side of the tumbler. Upon contact, this material, transite, is generally used to face the glass contacting surfaces of the arms 22 and 34. The positioning block 41 is made to conform to the diameter of the tumbler 10 and will receive the tumbler when it is slid across dead plate 20 by arm 22.

In the process, it is preferred that the burner be operated intermittently in such a manner that the flame produced impinges on the surface glass of the rim of the tumbler for approximately 1.8 seconds and is at a temperature at the point of impingement of approximately 4000° F. It has been found that such conditions produce a satisfactory flow of the surface glass only of the tumbler rim and the major cross-sectional portion of the rim is not materially elevated in temperature. If the entire rim is heated to a flow temperature, such as in prior art fire finishing operations, the rim finish would distort out-of-round, which distortion would necessitate the use of a sizing head to bring the rim back into satisfactory round dimension.

Aside from the preferred example, above stated, it has been found that the firing time may be varied between 1 and 2 seconds and the firing temperature accordingly varied in the range of 3500° to 4500° F. to produce surface flowability of the surface glass of the rim within that time interval without affecting the temperature materially of the glass in the rim cross-section of the tumbler, yet retain the process adaptable to use with commercial machines of the type illustrated.

The aforementioned operating conditions, it was found, will eliminate the necessity of sizing the fire finished rim, as distinguished from the fire finishing techniques previously employed.

On the drawings, FIG. 2 illustrates the condition of the surface of the rim at the time the article is removed from the mold 11. By flowing the surface glass of the rim under the method of this invention will produce a smooth fire finished rim finish similar to that shown by FIG. 3.

Various modifications may be resorted to within the spirit and scope of the appended claims.

We claim:

1. The method of fire finishing the mouth forming rim of glass tumblers comprising successively transferring the tumblers from their forming mold to an upright position upon a stationary support, cooling said tumblers while on said support, shifting said tumblers successively to underlie an oxygen-gas fired flame annularly directed downwardly onto the rim of each of the tumblers while cooling the main body portion thereof and locally heating the surface glass of said rim of each tumbler for a period of from 1 to 2 seconds, said flame being of a temperature ranging from 3500 to 4000° F., and thereafter transferring said tumblers to a moving conveyor surface.

2. The method of fire finishing the mouth forming rim of machine molded glass tumblers in continuous production comprising successively transferring each molded tumbler successively from its forming mold to an upright position upon one side of a stationary perforate surface of the molding machine, cooling each said tumbler while on said surface by flooding it with a cooling fluid, shifting the tumbler to a spaced stationary support, locally heating the rim of each said tumbler by an oxygen-gas fired annular flame sufficiently to cause flow of the surface glass only on said rim without heating the internal section of the glass of the rim, said heat being applied for a period not in excess of two seconds and at a temperature ranging from 3500° F. to 4500° F., and transferring said tumblers onto an adjacent straight-line conveyor, whereupon they are transported to an annealing lehr.

3. The method of fire finishing the mouth forming rim of machine molded glass tumblers comprising successively transferring the tumblers from their forming mold to an upright position upon a stationary support, cooling said tumblers while on said support, shifting each said tumbler thereon to underlie an oxygen-gas fired flame directed downwardly to impinge the surface of its said rim, maintaining each said tumbler thereat for a period of 1½ to 2 seconds while maintaining said flame at a temperature of about 4000° F. to thereby heat the rim to cause flow of its surface glass only, and thereafter removing each said tumbler from the flame.

4. The method of fire finishing the mouth forming rim of machine molded glass tumblers comprising successively transferring the tumblers from their forming mold to an upright position upon a stationary support, cooling said tumblers while on said support, shifting said tumblers thereon in succession to a stationary position to underlie a pair of downwardly projected flames defining concentric circular paths, the innermost flame being of lesser diameter than the rim of the tumbler and directed angularly to impinge the rim at its inner surface and the outermost flame being of substantially the same diameter as said rim and directed vertically to impinge the rim at its top and along its outer surface, maintaining each said tumbler thereat for a period not in excess of 2 seconds while maintaining said pair of flames each at a temperature of approximately 4000° F. at their points of impingement on said rim to thereby heat the rim to cause flow of its surface glass only, and thereafter removing each said tumbler from said flames.

5. In a method of machine manufacture of glass tumblers, said tumblers including a molded mouth forming rim, the steps comprising successively molding tumblers in a mold of a forming machine, transferring the molded tumblers from said mold to an upright position upon a stationary support, cooling the tumblers while each is on said support, shifting each said tumbler laterally on said support to register the rim thereof under an annular burner, impinging flame supplied by the burner onto the rim of each said tumbler while stationary in said position of registration for a period not in excess of two seconds, said flame ranging between 3500° F.–4500° F., and subsequently moving the tumblers onto a traveling conveyor, whereupon they are transferred to an annealing lehr.

References Cited in the file of this patent

UNITED STATES PATENTS

| | | |
|---|---|---|
| 766,193 | Nolan | Aug. 2, 1904 |
| 766,514 | Nolan | Aug. 2, 1904 |
| 772,902 | Nolan | Oct. 18, 1904 |
| 1,626,739 | Lents et al. | May 3, 1927 |
| 2,073,144 | Darrah | Mar. 9, 1937 |
| 2,248,714 | Lytle | July 8, 1941 |
| 2,338,841 | Fedorchak et al. | Jan. 11, 1944 |
| 2,507,433 | Borchert et al. | May 9, 1950 |
| 2,556,469 | Dahms | June 12, 1951 |

FOREIGN PATENTS

| | | |
|---|---|---|
| 82,396 | Norway | Sept. 14, 1953 |